United States Patent
Arnison et al.

(10) Patent No.: US 7,287,739 B2
(45) Date of Patent: Oct. 30, 2007

(54) FAST CLOSING WELL CHOKE

(75) Inventors: Dean Arnison, Ellon (GB); David Spencer, Banchory (GB); Dominic Stott, Ellon (GB)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 11/264,319

(22) Filed: Nov. 1, 2005

(65) Prior Publication Data

US 2007/0095411 A1 May 3, 2007

(51) Int. Cl.
*F16K 31/143* (2006.01)
(52) U.S. Cl. .................................. 251/14; 251/229
(58) Field of Classification Search .................. 251/14, 251/229
See application file for complete search history.

(56) References Cited

U.S. PATENT DOCUMENTS

| | | | | |
|---|---|---|---|---|
| 620,287 | A * | 2/1899 | Donnelly .................. | 251/14 |
| 2,473,013 | A * | 6/1949 | Crane et al. .............. | 251/14 |
| 2,663,318 | A * | 12/1953 | Lakso ...................... | 251/14 |
| 3,765,642 | A * | 10/1973 | Nelson ..................... | 251/14 |
| 4,799,644 | A * | 1/1989 | Gaianigo ................... | 251/14 |
| 4,871,143 | A | 10/1989 | Baker | |
| 5,074,519 | A | 12/1991 | Pettus | |
| 5,094,426 | A * | 3/1992 | Zajac ........................ | 251/14 |
| 5,484,133 | A * | 1/1996 | Oliver ....................... | 251/14 |
| 5,577,532 | A | 11/1996 | Palmer | |
| 6,125,874 | A | 10/2000 | Holliday | |
| 6,182,678 | B1 | 2/2001 | Ma et al. | |
| 6,315,264 | B1 | 11/2001 | Baker | |
| 6,684,897 | B2 * | 2/2004 | Sundararajan ........... | 137/15.19 |
| 2003/0020034 | A1 | 1/2003 | Newport et al. | |

FOREIGN PATENT DOCUMENTS

| | | | |
|---|---|---|---|
| GB | 2346429 A | 8/2000 | |
| GB | 2410963 A | 8/2005 | |

* cited by examiner

*Primary Examiner*—John Fox
(74) *Attorney, Agent, or Firm*—Bracewell & Giuliani LLP

(57) ABSTRACT

A well choke has a quick closure device quickly moving the choke element to a closed position. The closure device mounts between an actuator and a choke. The actuator has a stepper motor and gear train for incrementally moving an actuator rod and a choke element linearly. The quick closure has a hydraulic cylinder that will move the entire actuator, including the actuator rod, toward the choke, when actuated.

18 Claims, 3 Drawing Sheets

FAST CLOSING WELL CHOKE

FIELD OF THE INVENTION

This invention relates in general to well chokes for controlling the pressure and flow rate of well fluid flow, and in particular to a quick closing mechanism that causes the well choke to close rapidly.

BACKGROUND OF THE INVENTION

Oil and gas wells typically utilize a choke for controlling the flow from the production tubing. The choke has a choke element that moves within a choke housing to vary the flow area. One common type of choke, particularly for subsea production, has a stepping drive actuator for varying the position of the choke element. An actuator rod extends from the actuator into engagement with the choke element. The actuator typically has a gear train connected with a stepper motor, which when driven, causes rotation of a threaded drive nut. The drive nut engages a threaded portion on the actuator rod to move the rod linearly in response to the rotation. Chokes are constructed of materials that enable them to withstand erosion due to high flow rates and granular material within the well fluid.

Subsea production trees have a number of valves that can be opened and closed for controlling the well fluid. The valves are typically gate valves that operate either in a fully closed or fully open position. Because of the erosive conditions, gate valves do not serve as chokes. Typically subsea chokes do not serve as emergency valves because chokes close too slowly in the event of an emergency. If a subsea choke could effectively serve as an emergency shut off valve, fewer valves would be required on a tree.

One prior art solution to using a choke also as an emergency shutoff valve involves providing the choke actuator with a ball screw driven by a hydraulic piston to rotate the ROV (remote operated vehicle) override of the choke. That design, however, is complex and fairly large. Another solution is to utilize a hydraulic actuator with a bank of accumulators, however in deeper waters, the amount of accumulation required would be extensive. In another approach, U.S. Pat. No. 6,315,264 discloses a choke modified for rapid closure.

SUMMARY OF THE INVENTION

In this invention, a quick closure assembly is mounted between a substantially conventional choke actuator and a choke housing. When actuated, the quick closure assembly causes the actuator housing and actuator rod to move in unison with each other in a closing direction relative to the choke housing. This movement causes the choke element to close the flow passage.

In the preferred embodiment, the quick closure assembly includes a hydraulic chamber that causes the movement of the actuator housing in the closing direction. Further, in the example shown, the quick closure assembly has a spring that biases the actuator housing in an opening direction relative to the choke housing. The hydraulic chamber overcomes the bias of the spring to cause the closing movement. When the hydraulic pressure is released, the spring moves the actuator housing back to the operational position.

DETAILED DESCRIPTION OF THE INVENTION

Figure 1:
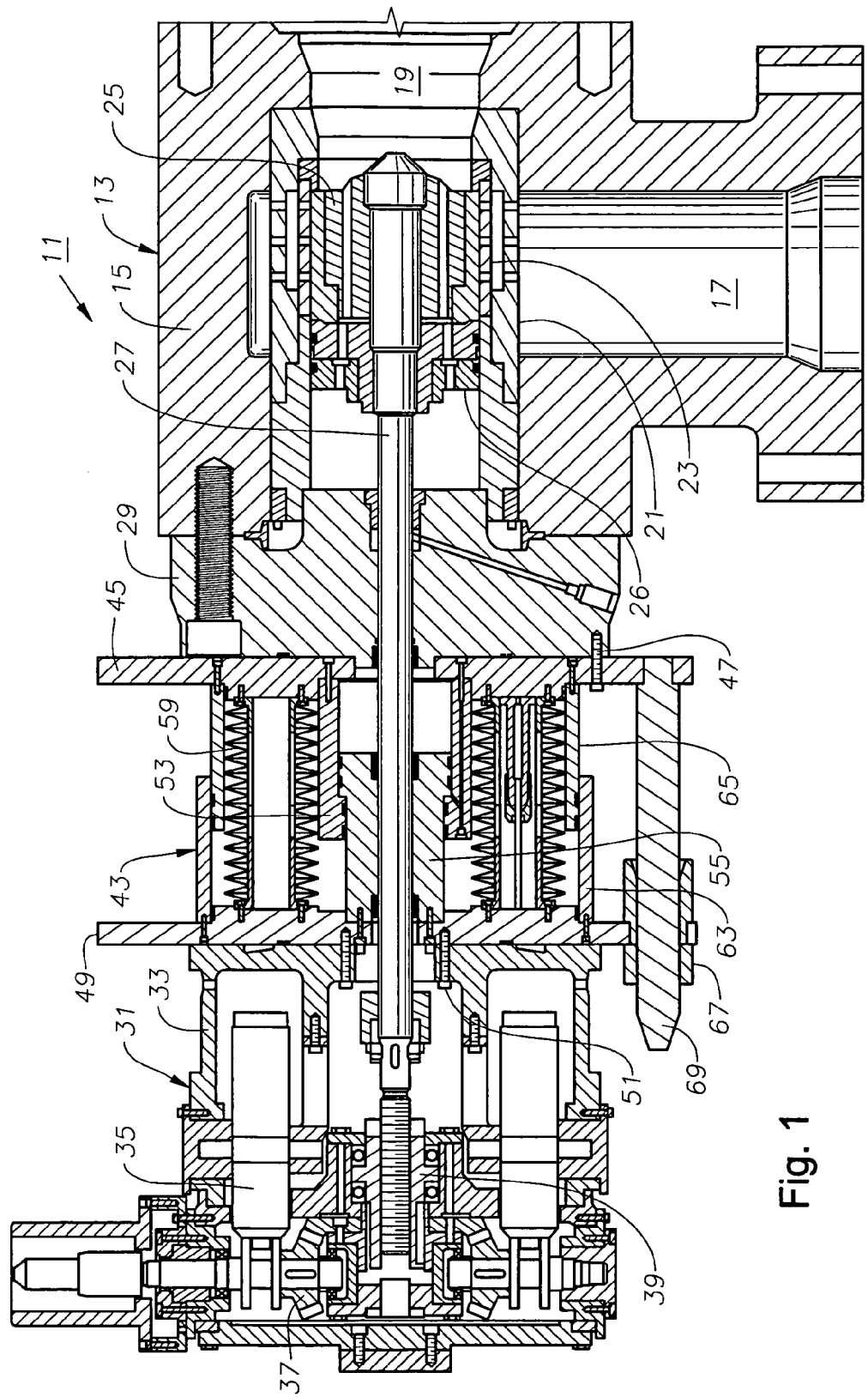
FIG. 1 is a sectional view illustrating a choke assembly constructed in accordance with this invention, showing the choke in a closed position and the quick closure mechanism in an expanded width position.
Figure 2:
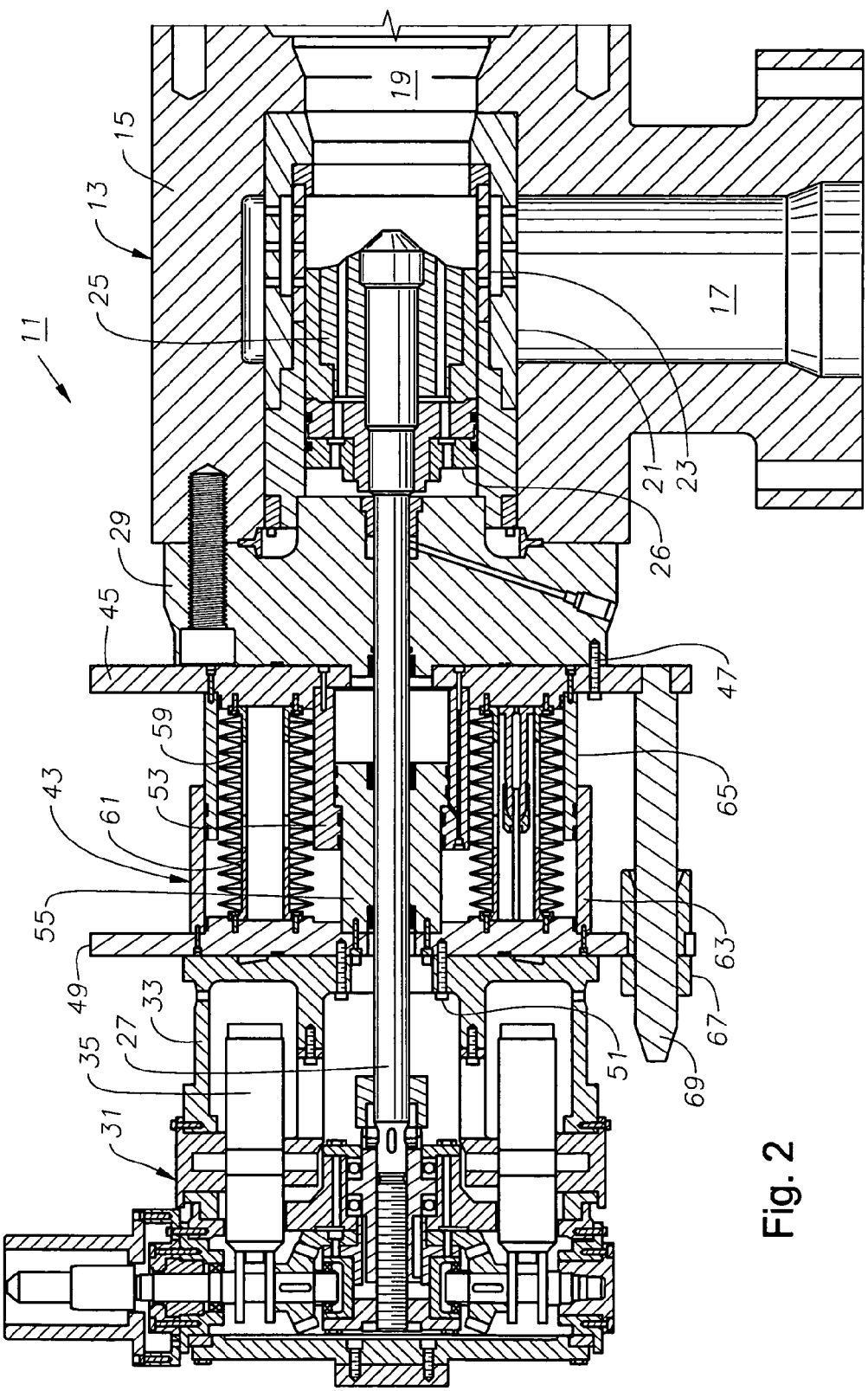
FIG. 2 is an enlarged sectional view of a portion of the choke assembly of FIG. 1, showing the choke element in an open position and the quick closure assembly in an expanded width position.
Figure 3:
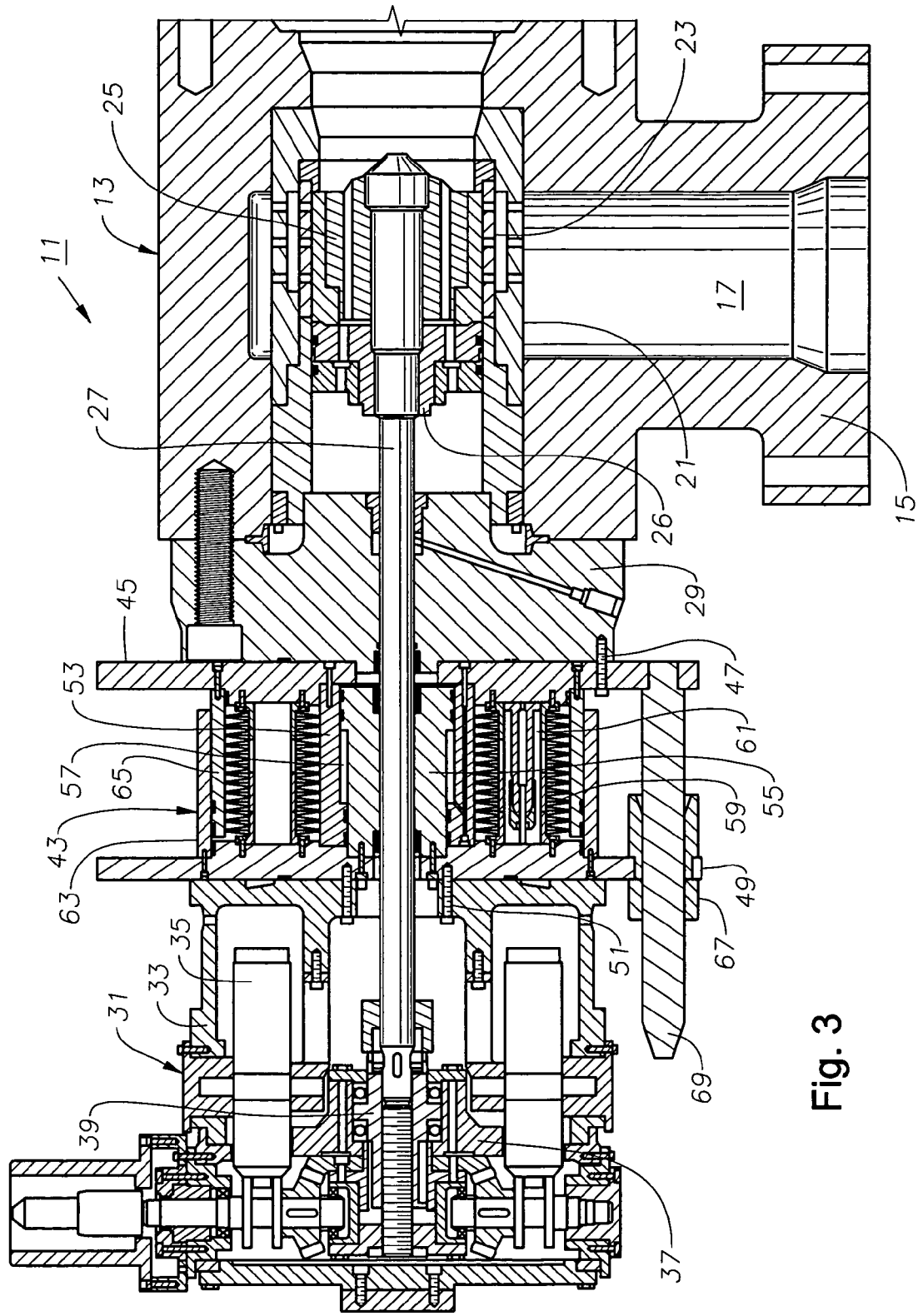
FIG. 3 is an enlarged view similar to FIG. 1, but showing the quick closure assembly in a contracted position.

Referring to FIG. 1, well choke assembly 11 has a conventional choke 13, which may be of a variety of types. In this embodiment, choke 13 has a choke housing 15 with an inlet 17 and an outlet 19 that are 90 degrees relative to each other. A cage outer sleeve 21 and a cage inner sleeve 23 comprise cylindrical members with apertures that are located at the junction between inlet 17 and outlet 19. A choke element 25 moves linearly along on the axis of outlet 19. Apertures extend through inner and outer sleeves 21, 23, and the position of choke element 25 determines how many apertures will be blocked and how many will be open. In FIGS. 1 and 3, all of the apertures within the inner sleeve 23 are blocked, preventing any flow from inlet 17 to outlet 19. In FIG. 2, the apertures within inner and outer sleeves 21, 23 are open.

Choke elements 21, 23 and 25 may be of a variety of types. In this embodiment element 25 comprises a multi-piece cylindrical member that includes at least one, and preferably two annular seal members 26. Choke element 25 is centrally mounted on an actuator rod 27 that moves linearly. Actuator rod 27 extends through an end plate 29 of choke housing 15 to an actuator 31.

Actuator 31 is also conventional and may be of a variety of types. In this embodiment, actuator 31 has an actuator housing 33, which in the prior art would connect directly to end plate 29 of choke housing 15. In this embodiment, actuator housing 33 is spaced from end plate 29. Actuator 31 has one or more stepper motors 35, which operate a gear train 37 to rotate a drive nut 39 when the position of choke element 25 is to be changed. Drive nut 39 has internal threads that engage external threads on part of actuator rod 27. Actuator rod 27 is held against rotation in a conventional manner, thus rotation of drive nut 39 causes actuator rod 27 to move linearly along the axis of actuator rod 27.

A quick closure assembly 43 mounts between actuator housing 33 and choke housing 15. Quick closure assembly 43 has a choke plate 45, which is a mounting plate that mounts to choke housing end plate 29. Fasteners 47 extend from choke plate 45 into end plate 29 for securing quick closure assembly 43 to choke 13. Quick closure assembly 43 also has an actuator plate 49 on the opposite side. Actuator plate 49 bolts to an end plate of actuator 31, such as by fasteners 51. Plates 45 and 49 have holes through their centers through which actuator rod 27 passes.

Quick closure assembly 43 includes a hydraulic cylinder 53, which is mounted to one of the plates 45, 49. In this embodiment, cylinder 53 is mounted to plate 45, but it could be otherwise. Cylinder 53 extends toward plate 49 and terminates short of it. A piston 55 is connected to plate 49 and extends into cylinder 53. Actuator rod 27 extends concentrically through cylinder 53 and piston 55. Cylinder 53 and piston 55 may be considered to be an inner sleeve with an extendable length that surrounds actuator rod 27. Piston 55 and cylinder 53 have enlarged areas that cooperate and seal against each other to form a hydraulic fluid chamber 57 (FIG. 3). When hydraulic fluid pressure is supplied to chamber 57, piston 55 will pull actuator 31 along with actuator rod 27 toward choke 13. Hydraulic fluid passages extend through the sidewall of cylinder 53 for supplying hydraulic fluid pressure to chamber 57.

In this example, springs 59 are mounted between plates 45 and 49, urging them apart from each other. Alternately, piston 55 and cylinder 53 could be made double-acting to cause return by supplying hydraulic fluid. Piston 55 and cylinder 53 are located on the central axis of plates 45, 49. Actuator rod 27 extends through piston 55 but does not seal or connect to it. Movement of piston 55 does not cause movement of actuator rod 27 relative to actuator 31. Springs 59 are located outward of cylinder 53 in this embodiment and spaced around the circumference of cylinder 53. Each spring 59 is mounted on a spring guide 61 that retains spring guides 59. Two hydraulic feeds to stepper motors 35 are shown mounted inside spring guides 59. Guides 61 are retractable from the lengths shown in FIG. 1 to the lengths shown in FIG. 3.

A first outer sleeve portion 63 is stationarily mounted to actuator plate 49. A second outer sleeve potion 65 is stationarily mounted to choke plate 45. Outer sleeve portions 63, 65 encircle springs 59 and are concentric with the axis of actuator rod 27. Outer sleeve portions 63, 65 slide sealingly relative to each other from the expanded position shown in FIG. 1 to the retracted position shown in FIG. 3. Preferably the annular chamber between outer sleeve portions 63, 65 and piston and cylinder 55, 53 is filled with a liquid that communicates with an accumulator (not shown) that serves to balance the internal pressure within outer sleeve portions 63, 65 with the hydrostatic pressure on the exterior.

Quick closure assembly 43 also has an anti-rotation and spring pre-compressing device to prevent rotation of choke 13 relative to actuator 31. In this embodiment, the anti-rotation device includes a guide receptacle 67 mounted radially outward of outer sleeves 63, 65. Guide receptacle 67 could be either mounted to plate 49, as shown, or to plate 45. A guide pin 69 is mounted to the other of the plates, which in this case is plate 45. Guide pin 69 extends parallel to the axis of actuator rod 27 and slidingly engages guide receptacle 67.

In operation, FIG. 1 shows well choke assembly 11 in a closed position, but with quick closure assembly 43 in its normal, expanded position. Choke element 25 blocks the apertures through choke cage member 23, preventing any flow from inlet 17 to outlet 19.

To allow flow, the operator actuates stepper motors 35, which in turn rotate threaded nut 39 a desired increment. This rotation causes actuator rod 27 to retract, pulling choke element 25 to a retracted position. This movement exposes some of the apertures through cage member 23 to allow flow from inlet 17 to outlet 19, as shown in FIG. 2. Quick closure assembly 43 remains in its normal expanded position whether choke 13 is open, as in FIG. 2, closed, as in FIG. 1, or partially open (not shown).

To quickly close choke 13, the operator supplies hydraulic fluid pressure to chamber 57, as shown in FIG. 3. This causes plates 45, 49 to move toward each other. The entire actuator 31 will move toward choke 13, along with actuator rod 27. This movement causes choke element 25 to move to the closed position. During this movement, actuator rod 27 moves in unison with actuator housing 33 thus no power needs to be supplied to motors 35 (FIG. 1). Actuator rod 27 remains in the same position relative to actuator housing 33. Choke element 25 moves a distance equal to the difference between the expanded and contracted positions of quick closure assembly 43. If choke element 25 was in a partially open position when quick closure assembly 43 is initially actuated, rather than the fully open position of FIG. 2, then it would be stroked less to the right than shown in FIG. 3. The length of choke element 25, which includes seal plates 26, is selected so that it will block all of the apertures through choke cage sleeve 23 regardless of the position of choke element 25 relative to choke sleeves 23 when quick closure assembly 43 was actuated.

When the hydraulic pressure in hydraulic chamber 57 is relieved, springs 59 will push actuator plate 49 and actuator 31 back away from plate 45 to the expanded position of FIGS. 1 and 2. Actuator rod 27 moves in unison with actuator housing 31 during this expansion movement, as well. Choke element 25 will resume the same position relative to sleeves 21, 23 that it had before quick closure assembly 43 was actuated.

The invention has significant advantages. The quick closure assembly can be mounted to existing choke and actuator assemblies with very little modification. The quick closure assembly allows the choke to function as an emergency valve by allowing it to be rapidly closed.

While the invention has been shown in only one of its forms, it should be apparent to those skilled in the art that it is not so limited but susceptible to various changes without departing from the scope of the invention.

We claim:

1. A well choke apparatus, comprising:
   a choke housing having a flow passage;
   a choke element carried in the choke housing for linear movement in forward and rearward directions relative to the choke housing to vary a flow area through the flow passage;
   an actuator housing located rearward of the choke housing;
   an actuator rod extending forward from the actuator housing to the choke element for linearly moving the choke element;
   a drive mechanism having a motor and a drive train in the actuator housing for selectively extending and retracting the rod; and
   a quick closure assembly having a rearward side mounted to a forward side of the actuator housing and a forward side mounted to a rearward side of the choke housing for moving the actuator housing, the entire drive mechanism and the rod in unison with each other in a closing direction relative to the choke housing to cause the choke element to close the flow passage.

2. The apparatus according to claim 1, wherein the quick closure assembly comprises:
   a hydraulic chamber and a piston carried within for causing the movement of the actuator housing, the entire drive mechanism and the rod in the closing direction, the hydraulic chamber being stationarily fixed to one of the forward side of the actuator housing and the rearward side of the choke housing, and the piston being stationarily fixed to the other of the forward side of the actuator housing and the rearward side of the choke housing.

3. The apparatus according to claim 1, wherein the quick closure assembly comprises:
  a spring for biasing the actuator housing in an opening direction relative to the choke housing, the spring having one end in engagement with the forward side of the actuator housing and the other end in engagement with the rearward side of the choke housing, the spring being compressed between the housings for urging the actuator housing away from the choke housing.

4. The apparatus according to claim 1, wherein the quick closure assembly comprises:
  a hydraulic chamber and a piston carried within the hydraulic chamber, the hydraulic chamber being fixed to one of the forward side of the actuator housing and the rearward side of the choke housing, and the piston being fixed to the other of the forward side of the actuator housing and the rearward side of the choke housing, so that the application of hydraulic fluid pressure to one side of the piston causes movement of the actuator housing in a forward direction toward the choke housing; and
  a spring having a rearward end in engagement with the forward side of the actuator housing and a forward end in engagement with the rearward side of the choke housing for urging the actuator housing a rearward direction apart from the choke housing.

5. The apparatus according to claim 1, wherein the quick closure assembly comprises:
  an actuator plate stationarily mounted to the forward side of the actuator housing;
  a choke plate stationarily mounted to the rearward side of the choke housing;
  a cylinder stationarily mounted to one of the plates and extending toward the other of the plates;
  a piston stationarily mounted to the other of the plates and extending into the cylinder, so that the application of hydraulic fluid pressure causes the actuator plate to move forward toward the choke plate.

6. The apparatus according to claim 1, wherein the quick closure assembly comprises:
  an actuator plate stationarily mounted to the forward side of the actuator housing;
  a choke plate stationarily mounted to the rearward side of the choke housing;
  a cylinder stationarily mounted to one of the plates and extending toward the other of the plates;
  a piston stationarily mounted to the other of the plates and extending into the cylinder;
  the rod extending concentrically through the piston and the cylinder;
  a spring compressed between the plates; wherein
  the application of hydraulic fluid pressure to the piston causes the actuator plate to move toward the choke plate; and
  removing hydraulic fluid pressure causes the spring to push the actuator plate away from the choke plate.

7. The apparatus according to claim 1, further comprising:
  a guide receptacle stationarily mounted to one of the housings; and
  a guide member stationarily mounted to the other of the housings and in sliding engagement with the guide receptacle when the actuator housing moves in the closing direction, the guide member and the guide receptacle having a common longitudinal axis offset from and parallel to an axis of the actuator rod to prevent rotation of the housings relative to each other.

8. The apparatus according to claim 1, wherein the quick closure assembly comprises:
  an outer sleeve assembly that is contractible from an extended to a contracted position, the outer sleeve assembly having a forward end stationarily fixed to the rearward side of the choke housing and a rearward end stationarily fixed to the forward side of the actuator housing;
  an inner sleeve assembly located concentrically within the outer sleeve assembly, the inner sleeve assembly being contractible from an extended to a contracted position, the inner sleeve assembly having a forward end stationarily fixed to the rearward side of the choke housing and a rearward end stationarily fixed to the forward side of the actuator housing, the rod extending concentrically within the inner sleeve assembly;
  a piston and hydraulic fluid chamber incorporated within one of the sleeve assemblies to cause the inner and outer sleeve assemblies to move to the contracted position when supplied with hydraulic fluid pressure; and
  a spring located in an annular space between the inner and outer sleeve assemblies for urging the inner and outer sleeve assemblies to the extended positions.

9. A well choke apparatus for causing quick closure of a choke assembly having a choke housing, a choke element, an actuator housing, and an actuator rod extending in a forward direction from the actuator housing to the choke element for linearly moving the choke element, the apparatus comprising:
  an actuator plate for mounting to a forward side of the actuator housing;
  a choke plate for mounting to a rearward side of the choke housing;
  a cylinder stationarily mounted to one of the plates and extending toward the other of the plates; and
  a piston stationarily mounted to the other of the plates and extending into the cylinder, so that the application of hydraulic fluid pressure to the cylinder causes the actuator plate to move linearly toward to the choke plate for moving the actuator housing and the rod in unison with each other in a closing direction relative to the choke housing to cause the choke element to close the flow passage.

10. The apparatus according to claim 9, further comprising:
  a spring mounted between the plates for urging the plates apart from each other.

11. The apparatus according to claim 9, wherein the cylinder and piston are centered on the plates.

12. The apparatus according to claim 9, further comprising:
  an outer sleeve having a first portion mounted to the actuator plate and a second portion mounted to the choke plate, the first and second portions sealingly engaging each other and being retractable when the actuator plate moves in the closing direction, the outer sleeve concentrically encircling the cylinder and piston; and
  a spring mounted between the plates in an annular space between the outer sleeve and the cylinder for urging the plates in an opening direction.

13. The apparatus according to claim 9, further comprising:
  a guide receptacle stationarily mounted to one of the plates; and a guide member stationarily mounted to the other of the plates and in sliding engagement with the guide receptacle when the actuator plate moves in the closing direction, the guide member and the guide receptacle having a common longitudinal axis offset from a central axis of the plates to prevent rotation of the plates relative to each other.

14. The apparatus according to claim 9, further comprising:

an outer sleeve having a first portion mounted to the actuator plate and a second portion mounted to the choke plate, the first and second portions sealingly engaging each other and being retractable when the actuator plate moves in the closing direction, the outer sleeve concentrically encircling the cylinder and piston;

a spring mounted between the plates in an annular space between the outer sleeve and the cylinder for urging the plates in an opening direction;

a guide receptacle stationarily mounted to one of the plates radially outward from the outer sleeve, relative to a central axis of the plates; and a guide member stationarily mounted to the other of the plates and in sliding engagement with the guide receptacle when the actuator plate moves in the closing direction to prevent rotation of the plates relative to each other.

15. A method of quickly closing a well choke having a choke housing, a choke element carried in the choke housing for linear movement relative to the choke housing, an actuator housing, an actuator rod extending from the actuator housing to the choke element for linearly moving the choke element in forward and rearward directions, and a drive mechanism including a motor and gear train in the actuator housing for selectively extending and retracting the rod, the method comprising:

(a) mounting a rearward side of a quick closure assembly to a forward side of the actuator housing forward of the motor and gear train and mounting a forward side of the quick closure assembly to a rearward side of the choke housing; and (b) actuating the quick closure assembly, to cause it to move the actuator housing, the entire drive mechanism and the rod in unison with each other in a closing direction relative to the choke housing to cause the choke element to move to a closed position.

16. The method according to claim 15, wherein step (b) comprises applying hydraulic fluid pressure to the quick closure assembly.

17. The method according to claim 15, wherein:

step (a) comprises placing a rearward end of a spring in engagement with a forward side of the actuator housing and a forward end of the spring in engagement with the rearward side of the choke housing, the spring being compressed so that it urges the actuator housing to move away from the choke housing;

step (b) comprises applying hydraulic fluid pressure to the quick closure assembly to move the actuator housing toward the choke housing; and wherein the method further comprises:

releasing the hydraulic fluid pressure from the quick closure assembly and with the spring moving the actuator housing away from the choke housing.

18. The method according to claim 15, further comprising preventing rotation of the actuator housing relative to the choke housing while performing step (b).

* * * * *